US008654945B2

(12) United States Patent
Berranger et al.

(10) Patent No.: US 8,654,945 B2
(45) Date of Patent: Feb. 18, 2014

(54) BLOCKING A CHANNEL IN A COMMUNICATION SYSTEM

(75) Inventors: Jean-Alexis Berranger, Biviers (FR); Alain Comment, Echirolles (FR); Frederic Guerber, Champagnier (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1871 days.

(21) Appl. No.: 11/490,493

(22) Filed: Jul. 19, 2006

(65) Prior Publication Data

US 2007/0172038 A1    Jul. 26, 2007

(30) Foreign Application Priority Data

Oct. 17, 2005    (EP) .................................... 05300830

(51) Int. Cl.
*H04M 15/00*    (2006.01)
*H04W 72/00*    (2009.01)

(52) U.S. Cl.
USPC ...................................... 379/112.04; 455/453

(58) Field of Classification Search
USPC ......... 379/265, 266, 219, 221, 112, 268, 272, 379/309, 210.02, 211.01, 221.06, 112.03, 379/112.04, 112.1, 266.04; 370/270, 352, 370/353, 354, 355, 356, 357; 455/450, 451, 455/452, 455
See application file for complete search history.

(56) References Cited

U.S. PATENT DOCUMENTS

| | | | | |
|---|---|---|---|---|
| 5,295,183 A | * | 3/1994 | Langlois et al. ......... | 379/112.04 |
| 5,844,886 A | * | 12/1998 | Szentesi .................... | 370/230 |
| 6,044,144 A | * | 3/2000 | Becker et al. ............ | 379/265.02 |
| 6,081,590 A | * | 6/2000 | Crowley et al. .......... | 379/221.13 |
| 6,170,011 B1 | * | 1/2001 | Macleod Beck et al. ..... | 709/224 |
| 6,243,449 B1 | * | 6/2001 | Margulis et al. ......... | 379/112.04 |
| 6,327,361 B1 | * | 12/2001 | Harshavardhana et al. .. | 379/230 |
| 6,330,313 B1 | * | 12/2001 | Hunt ............................. | 379/133 |
| 6,333,931 B1 | * | 12/2001 | LaPier et al. .................. | 370/385 |
| 6,363,065 B1 | * | 3/2002 | Thornton et al. ............. | 370/352 |
| 6,459,902 B1 | * | 10/2002 | Li et al. ......................... | 455/453 |
| 6,603,851 B1 | * | 8/2003 | Smith et al. .............. | 379/221.08 |
| 6,707,792 B1 | * | 3/2004 | Volftsun et al. ............... | 370/235 |
| 6,744,878 B1 | * | 6/2004 | Komissarchik et al. . | 379/265.03 |
| 6,792,099 B1 | * | 9/2004 | Na ............................ | 379/221.09 |
| 7,002,915 B1 | * | 2/2006 | Huberman et al. ........... | 370/233 |
| 7,522,607 B2 | * | 4/2009 | Bugenhagen et al. ... | 370/395.42 |
| 2001/0024497 A1 | * | 9/2001 | Campbell et al. ........ | 379/265.09 |
| 2002/0054670 A1 | * | 5/2002 | Shtivelman ................ | 379/88.16 |
| 2002/0159576 A1 | * | 10/2002 | Adams .......................... | 379/133 |

(Continued)

FOREIGN PATENT DOCUMENTS

WO        98/57504 A    12/1998

OTHER PUBLICATIONS

"Signalling system No. 7—ISDN user part Signalling procedures" (Dec. 1999).

(Continued)

*Primary Examiner* — Mohammad Islam
*Assistant Examiner* — Kharye Pope

(57) ABSTRACT

Embodiments relate to a communication system comprising a call handler arranged to process channel signalling received from a communication network; a workload controller comprising means to determine the workload of at least one processing resource of the communication system; wherein the call handler comprises means to block establishment of at least one channel in response to the workload of the at least one processing resource.

22 Claims, 5 Drawing Sheets

(56) References Cited

U.S. PATENT DOCUMENTS

| | | | |
|---|---|---|---|
| 2002/0184069 A1* | 12/2002 | Kosiba et al. | 705/8 |
| 2002/0196929 A1* | 12/2002 | Smith et al. | 379/266.01 |
| 2003/0107995 A1 | 6/2003 | Meskauskas et al. | |
| 2003/0215083 A1* | 11/2003 | McPartlan et al. | 379/265.02 |
| 2004/0054743 A1* | 3/2004 | McPartlan et al. | 709/206 |
| 2004/0107133 A1* | 6/2004 | Pantaleo et al. | 705/11 |
| 2004/0141508 A1* | 7/2004 | Schoeneberger et al. | 370/401 |
| 2004/0234062 A1* | 11/2004 | Jones | 379/210.02 |
| 2004/0240645 A1* | 12/2004 | Joseph et al. | 379/112.04 |
| 2005/0094799 A1* | 5/2005 | Elsey | 379/266.04 |
| 2005/0163288 A1 | 7/2005 | Lobig | |
| 2006/0002540 A1* | 1/2006 | Kreiner et al. | 379/265.02 |

OTHER PUBLICATIONS

"Digital exchange design objectives—operations and maintenance" (Mar. 1993).

* cited by examiner

BLOCKING A CHANNEL IN A COMMUNICATION SYSTEM

FIELD OF THE INVENTION

The present invention relates to a communication system and method.

BACKGROUND THE INVENTION

The OpenCall Media platform, available from Hewlett-Packard Company, can be used to realise a voice processing platform, that is, an automated or computer aided telephony system capable of handling a great number of simultaneous calls or circuits and servicing those calls or circuits using a number of voice menus of voice applications. The OpenCall media platform provides, in essence, an interactive voice response system.

It is well known within the art that the load on a voice platform can vary dynamically depending upon the operations currently being performed by the platform in response to services requested by callers or users and in response to the number of calls placed to the platform. For example, a number of callers simultaneously deciding to use voice recognition will increase the load on any voice recognition processors and software. Consequently, platform stability becomes influential in ensuring platform availability and maintaining an expected quality of service.

It is an object of embodiments of the present invention to at least mitigate one or more of the problems of the prior art.

SUMMARY OF INVENTION

Accordingly, a first aspect of embodiment of the present invention provides a communication system comprising a call handler arranged to process incoming call set up signalling received from a communication network; a workload controller comprising means to determine the workload of at least one processing resource of the communication system; wherein the call handler comprises means to block establishment of at least one channel in response to the determined workload of the at least one processing resource.

Advantageously, the at least one processing resource can influence the load on the overall communication system by publishing an indication of its load. More particularly, the published load is used to control the utilisation of system resources at the call signalling setup stage, in effect, to decide whether or not to accept an incoming call on the basis of the current workload of the resources.

A further aspect of embodiments of the present invention provides a method for influencing the workload of a communication system; the method comprising the steps of receiving an indication of a current workload of at least one processing resource; and blocking a request received from a communication network to establish at least one channel of the communication system in response to that indication.

A further aspect of embodiments of the present invention is directed to use of a signalling congestion control protocol to influence non-signalling workloads of resources of a communication system.

It will be appreciated that embodiments of the present invention can be realised in the form of hardware, software or a combination thereof. Accordingly, embodiments provide a computer program comprising executable code for implementing a system, method or use as described herein. For embodiments that are realised in the form of software or that at least use software, it will be appreciated that any such software can be stored on a medium such as optical or magnetically readable media or stored in a device such as a chip, ROM or other storage device like a memory card. Suitably, embodiments provide computer readable storage storing such a computer program.

Other aspects of embodiments of the invention are described hereafter and defined in the appended claims.

In contrast to conventional load balancing techniques, which redistribute the workload amongst, for example, a number of servers of a farm of servers according to which of those servers have capacity, it can be appreciated that embodiments of the invention influence circuit blocking, that is, the call signalling and, more particularly, call setup signalling, to control workload. Preferably, influencing call signalling is managed according to the workload of individual resources within, or accessible via, the platform rather than in response to the call setup capacity of the platform itself; the latter being the case for conventional congestion control protocols such as, for example, the ISUP protocol, which provides a mechanism for call control within a telephony exchange based upon a current congestion level. Within the ISUP protocol, in response to a congestion status, messages are sent to adjacent exchanges to request call gapping or call redirection measures to be taken in accordance with ITU recommendation Q.764. However, a disadvantage of this mechanism is the lack of control of the granularity at which it operates. Once invoked, it applies to all subsequent calls to a point code. Furthermore, the congestion control mechanism requires extremely careful setting of the actions in adjacent nodes or exchanges to ensure or maintain good performance of the network as a whole under load. Still further, the congestion control mechanism defined in Q.764 is tailored towards switching exchanges in which call set up signalling represents the vast majority of the work undertaken by the switching exchanges. This is in contrast to voice platforms in which the load varies according to the service to be provided once the call has been established.

BRIEF DESCRIPTION OF THE DRAWINGS

Embodiments of the present invention will now be described, by way of example only, with reference to the accompanying drawings in which.

DESCRIPTION OF EMBODIMENTS

Figure 1:
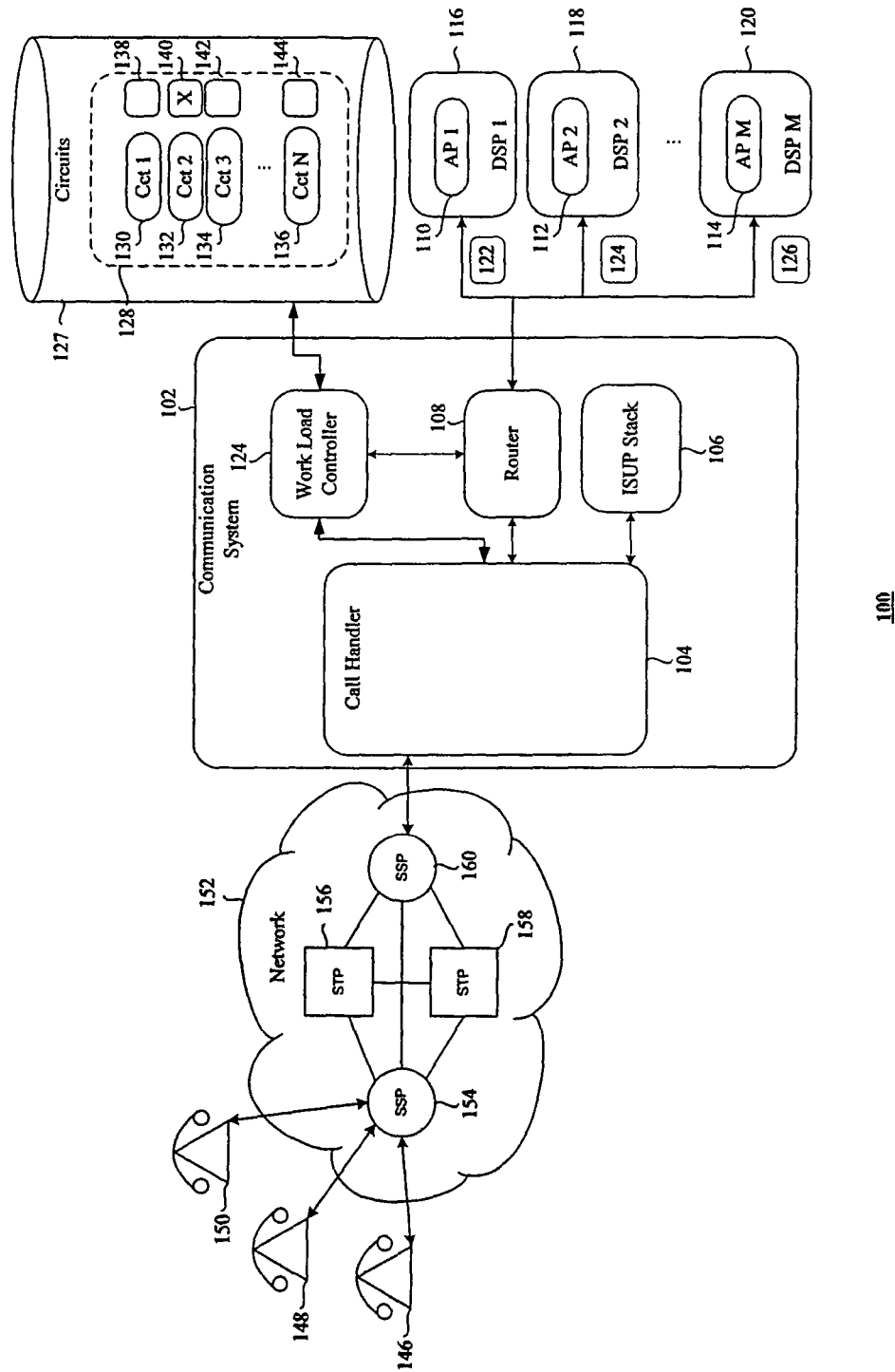
FIG. 1 illustrates a communication arrangement comprising a communication system according to an embodiment coupled to a communication network for communicating with a number of communication devices.

Referring to FIG. 1, there is shown a communication arrangement 100 comprising a communication system 102 according to an embodiment for communicating with a number of communication devices via a communication network. The communication system 102 comprises a call handler 104 having access to an ISUP stack 106 comprising data relating to at least one incoming call and, more usually, data relating to multiple such stacks of a number of simultaneous calls. The communication system 102 also comprises a router 108 for directing incoming calls to an appropriate resource to service incoming calls. In the embodiment illustrated, the appropriate resource may comprise an application running on a digital signal processing resource (DSPR) or some other processing resource. It can be appreciated that FIG. 1 depicts the communication system 102 as having access to a plurality of applications 110 to 114 running on respective DSPRs 116 to 120. The DSPRs perform functions associated with established calls such as, for example, outputting voice menus and processing response thereto or processing speech of an incoming call in an attempt to recognise utterances. It can be appreciated that these functions can be broadly classified as non-signalling functions, that is, functions that are not associated with call set up or tear down; the latter being broadly classified as signalling functions. It will be appreciated that signalling functions also encompass convention congestion control functions for managing signalling workloads of platforms.

The embodiment described makes reference to incoming calls. It is also applicable to outgoing calls and, therefore, not limited to incoming calls. The phrase "directing a call" means directing data associated with a call.

At least one application of the plurality of applications 110 to 114 or at least one DSPR of the plurality of DSPRs 116 to 120 is able to publish data representing an indication or a measure of its current load or percentage utilisation. Embodiments can be realised in which data from which such an indication or measure can be derived can be used as an alternative. It can be appreciated that the illustrated embodiment shows a number of such load data 122 to 126 published to the router 108. It will be appreciated that embodiments can be realised in which the published data is related to or originates from an application rather than a DSPR, which allows a greater granularity of performance assessment to be undertaken. Alternatively, or additionally, the load data might be associated with the DSP itself rather than with any one or more of a plurality of applications supported by the DSP.

The router 108 forwards the published load data 122 to 126 or a consolidation thereof to a workload controller 124 that determines whether or not the load or loads of a resource such as, for example, an application or applications, is acceptable. If the workload controller 124 determines that the workload of any given application or DSP is unacceptable, the workload controller 124 instructs the call handler 104 to block at least one circuit of a plurality of circuits supported by the platform 102. However, if the workload controller 124 determines that the workload of any given resource such as an application or DSP is acceptable, call signalling and, in turn, call set up is performed by the call handler 104 in the usual manner according to a call set up protocol used by the platform 102. Embodiments can be realised in which the call signalling is undertaken using SS7 signalling. However, other call signalling protocols can be used. It will be appreciated that circuit blocking involves influencing the response of the communication system 102 to call signalling such as, for example, call set up signalling, such that an incoming call is refused, indicated as being blocked or is transferred or directed to another network entity. Alternatively, or additionally, the circuit blocking can be arranged to influence the response of another network entity to any such signalling such that communication system 102 itself does not supply the blocking responses.

A database 127 is arranged to store data 128 associated with or representing the circuits or trunks available for use by the communication system 102. It can be appreciated that a number of such circuits 130 to 136 are illustrated. Each circuit 130 to 136 can be made selectively available for use by the platform. In the embodiment illustrated, that availability is managed using associated flags 138 to 144 that can be set or reset by the workload controller 124 according to whether or not the respective circuit is available or unavailable for use by the communication system 102. It can be appreciated that the second flag 140, associated with the second circuit 132, is illustrated as having been set to indicate that the second circuit is not available for use or will no longer be available for use.

Marking a circuit as being unavailable for use has the effect of ensuring that further incoming calls, or outgoing calls, cannot be established using that circuit. In these embodiments, a pending call using the circuit is not terminated immediately but allowed to complete naturally and, thereafter, the circuit will be unavailable for future use.

It will be appreciated that the database 128 represents a set of circuits available to the communication system 102 to support a number of simultaneous calls. The workload controller 124, in response to an indication from the call handler 104 of receipt of an incoming call request, determines from the database 128 whether or not a circuit is available to support that incoming call request. If the determination is positive, the workload controller 124 provides the call handler 104 with an indication to that effect whereupon conventional call set up continues to establish the call. However, if the determination is negative, the workload controller 124 provides the call handler 104 with an indication to that effect whereupon the call handler 104 is arranged to output data indicating that a call cannot be established.

The data output by the call handler indicating that a call cannot be established can comprise or can form part of data instructing another network entity to redirect the call to an adjacent, or different, communication system (not shown).

It can be appreciated that FIG. 1 shows a plurality of telephones 146 to 150 that are connected to a communication network 152. The communication network comprises a first SSP 154 coupled to a pair of STPs 156 and 158, which are, in turn, coupled to a second SSP 160. The plurality of telephones is illustrated as being connected to the first SSP 154. The communication system 102 is connected to the second SSP 160 of the communication network.

Figure 2:
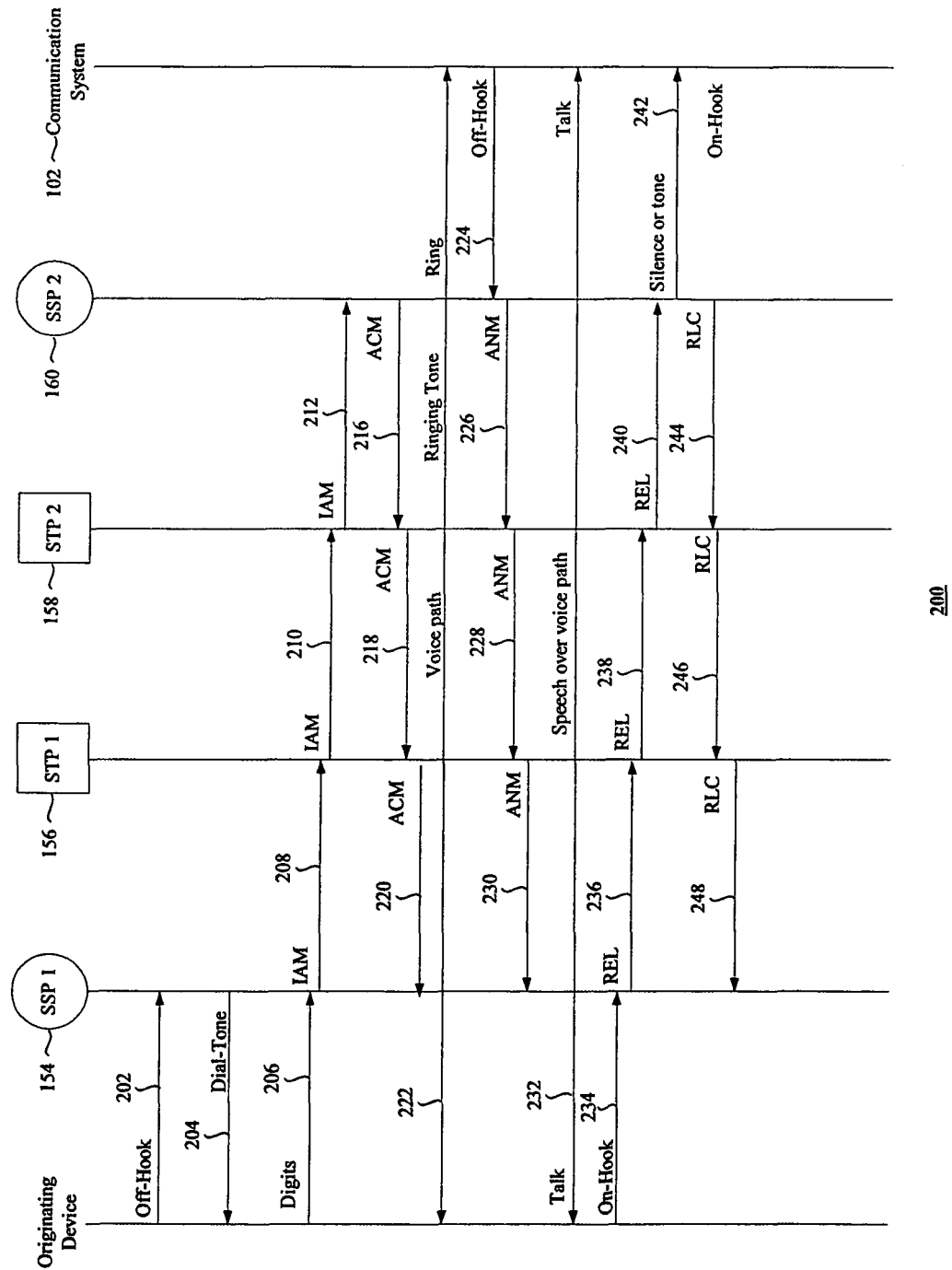
FIG. 2 shows call signalling according to a prior art communication arrangement.

FIG. 2 shows a signalling diagram of conventional call set up between an originating device such as, for example, one of the telephones 146 to 150 and the communication system 102 via the first SSP 154, the first STP 156, the second STP 158 and the second SSP 160. It can be appreciated that an off hook signal 202 providing an indication that the originating device has gone off hook or requires a circuit is sent from the originating device to the first SSP 154. In response, the first SSP 154 forwards data or a signal 204 representing a dial tone, or from which such a dial tone can be derived, to the originating device. Data or signals 206 representing digits dialled via the originating device are forwarded to the first SSP 154.

The first SSP 154 transmits an IAM message 208 to the first STP 156. The first IAM message 208 comprises ISUP call set up data such as, for example, data representing at least one or more of the origin code point, destination code point and circuit of the message or call. In response to receiving the first IAM message 208, the first STP 156 transmits a second IAM message 210, containing the same or substantially similar set up data, to the second STP 158. The second STP 158 transmits a third IAM message 212, containing the same or substantially similar set up data, to the second SSP 160.

In response to receiving the third IAM message 212, the second SSP 160 transmits an ACM message 216 to the second STP 158. The second STP 158 transmits a second ACM message 218 to the first STP 156 in response to receiving the first ACM message 216. In response to receiving the second ACM message 218 at the first STP 156. The first STP 156 transmits a third ACM message 220 to the first SSP 154 whereupon a voice path 222 is established bearing ringing tones that are output to both the originating device and the communication system 102.

The ringing tones are terminated in response to detecting an off hook signal 224 at the second SSP 160 from the communication system 102. Consequently, a first ANM message 226 is transmitted from the second SSP 160 to the second STP 158 in response to which the second STP 158 transmits a second ANM message 228 to the first STP 156. The first STP 156, in response to receiving the second ANM message 228, transmits a third ANM message 230 to the first SSP 154 whereupon speech signals 232 are exchanged via the voice path. It will be appreciated that the ringing tones could have been terminated by detecting an off hook signal associated with the originating device.

It will be appreciated that the call can be terminated by an action at the originating device or an action at the communication system 102. In the example illustrated, it will be assumed that the call is terminated by an action at the originating device. However, it will be appreciated that the signalling would be substantially similar but in the reverse direction if the call was terminated at the communication system 102. Assume, therefore, that an on hook signal 234 is transmitted from the originating device to the first SSP 154. Receipt of such an on-hook signal 234 causes the first SSP 154 to transmit a release message 236 to the first STP 156. The first STP 156, in turn, transmits a second release message 238 to the second STP 158. In response to receiving the second release message 238, the second STP 158 transmits a third release message 240 to the second SSP 160. The second SSP 160 causes silence or a tone representing the fact that the originating device has gone on hook to be forwarded to the communication system 102.

The second SSP 160 then transmits a first release confirmed message, RLC message 244, to the second STP 158. In response to receiving the first RLC message 244, the second STP 158 transmits a second RLC message 246 to the first STP 156. The first STP 156 then transmits a third RLC message 248 to the first SSP 154 thereby concluding call tear down.

Figure 3:
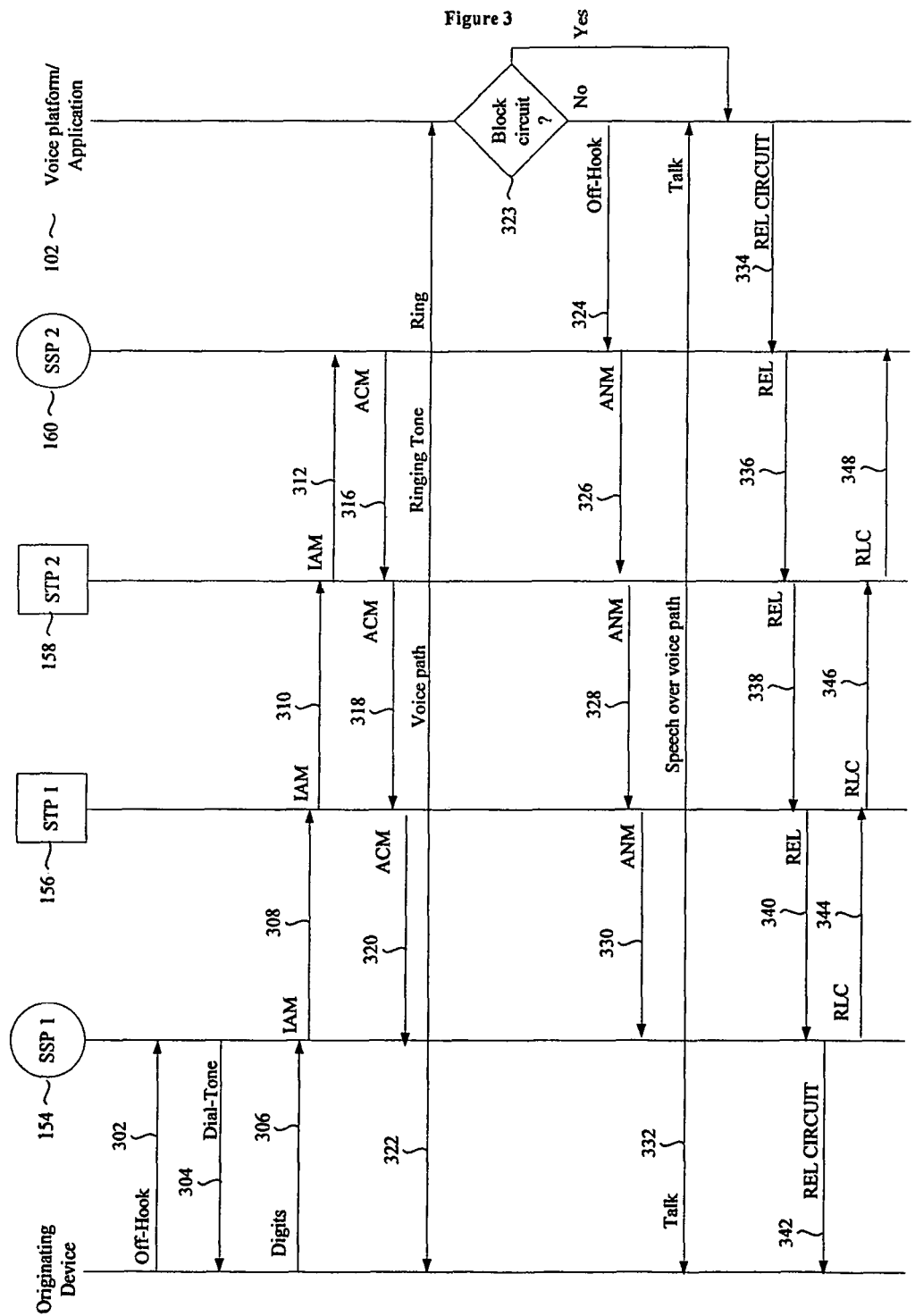
FIG. 3 illustrates call signalling according to an embodiment.

FIG. 3 shows a signalling diagram 300 for call set up and tear down according to an embodiment between an originating device such as, for example, one of the telephones 146 to 150 and the communication system 102 via the first SSP 154, the first STP 156, the second STP 158 and the second SSP 160. It can be appreciated that an off hook signal 302, providing an indication that the originating device has gone off hook or requires a circuit, is sent from the originating device to the first SSP 154. In response, the first SSP 154 forwards data or a signal 304 representing a dial tone, or from which such a dial tone can be derived, to the originating device. Data or signals 306 representing digits dialled via the originating device are forwarded to the first SSP 154.

The first SSP 154 transmits an IAM message 308 to the first STP 156. The first IAM message 308 comprises ISUP call set up data such as that described above. In response to receiving the first IAM message 308, the first STP 156 transmits a second IAM message 310, containing the same or substantially similar set up data, to the second STP 158. The second STP 158 transmits a third IAM message 312, containing the same or substantially similar set up data, to the second SSP 160.

In response to receiving the third IAM message 312, the second SSP 160 transmits an ACM message 316 to the second STP 158. The second STP 158 transmits a second ACM message 318 to the first STP 156 in response to receiving the first ACM message 316. In response to receiving the second ACM message 318 at the first STP 156, the first STP 156 transmits a third ACM message 320 to the first SSP 154 whereupon a voice path 322 is established bearing ringing tones that are output to both the originating device and the communication system 102.

A determination is made at step 323 as to whether or not circuit blocking or other congestion control mechanism is operational at the communication system 102. It will be appreciated that call blocking is made effective if the workload of one or more of the components, that is, resources (DSPRs or applications), is unacceptable. If the determination is negative, the ringing tones are terminated in response to detecting an off hook signal 324 at the second SSP 160 from the communication system 102. A first ANM message 326 is transmitted from the second SSP 160 to the second STP 158 in response to which the second STP 158 transmits a second ANM message 328 to the first STP 156. The first STP 156, in response to receiving the second ANM message 328, transmits a third ANM message 330 to the first SSP 154 whereupon speech signals 332 are exchanged via the voice path.

However, if the determination at step 323 is positive, that is, congestion control or circuit blocking is operational at the communication system 102, the communication system forwards a release circuit message 334 to the second SSP 160. The second SSP 160 forwards a first release circuit message 336 to the second STP 158 which, in turn, forwards a second release circuit message 338 to the first STP 156. The first STP 156 forwards a third release circuit message 340 to the first SSP 154 which, in turn, signals the circuit release 342 to the originating device. In response to receiving the third release circuit message 340, the first SSP 154 forwards an RLC message 344 to the first STP 156. The first STP 156, in response to receiving the first RLC message 344, forwards a second RLC message 346 to the second STP 158 which, in turn, forwards a third RLC message 348 to the second SSP 160 thereby completing call tear down.

The workload controller, in response to determining that the workload of one of the resources, such as, for example, one of the applications or DSPRs or any combination thereof, is unacceptable can issue a number of instructions to the connected SSP 160 in an effort to control or limit the workload of the resource. For example, the workload controller 124 might implement a circuit blocking policy which informs the communication network elements that the communication system 102 cannot accept further calls. However, such an embodiment, once a circuit has been identified as no longer being available, preferably implements a "block without release" policy in which the circuit is barred from receiving further calls but any pending call or calls is or are allowed to terminate naturally. Alternatively, or additionally, a call release policy can be implemented in which an incoming call is immediately responded to with a release message.

Conversely, when the load of the resources returns to acceptable levels, the workload controller 124 can implement a strategy of unblocking circuits.

The determination as to whether or not the workload of a resource is unacceptable can be made in a number of ways. Firstly, a simple threshold level can be used to determine whether or not the workload of a resource is acceptable. If the data representing the workload of a resource is above the threshold level, for example, then the workload of that resource may be deemed to be unacceptable and appropriate action taken to limit the calls processed by the communication system 102. If the data representing the workload of the resource is at or below the threshold level, then the workload of that resource may be deemed to be acceptable and call processing continues as normal. Alternatively, or additionally, a congestion regulation algorithm can be implemented that is based upon thresholds that are intended to introduce a measure of hysteresis. For example, if the workload of a resource exceeds a first predetermined threshold level, the workload controller 124 may block all currently unused circuits. If the resource usage reaches the first predetermine threshold level plus an additional predetermined percentage, then the workload controller can be arranged to block that percentage of used circuits. As indicated above, blocking circuits that are currently in use does not affect pending calls since a block only takes effect once a call has ended. If the resource usage drops below a second predetermined threshold level, the workload controller 124 can be arranged to unblock a predeterminable percentage of previously blocked circuits.

Alternatively, embodiments can be realised in which resource usage is periodically determined and compared against an upper threshold level. If the resource usage exceeds the upper threshold level, the workload controller 124 issues instructions to block a predetermined number or a predetermined percentage of the circuits of the communication system 102. If the resource usage is below a lower threshold level, the workload controller 124 takes action to unblock a predetermined number or a predetermined percentage of blocked circuits. The period can be, for example, every second or some other time interval. Still further, the time intervals might be aperiodic or established or calculated according to a predetermined pattern.

Alternatively, or additionally, embodiments may be realised in which the workload controller 124 is responsive to the rate of consumption or release of circuits. For example, if a predetermined number of circuits or predetermined percentage of circuits are being used or established per second, the workload controller 124 can be arranged to block a predetermined number or a predetermined percentage of available circuits. For example, if the available circuits are being consumed at a rate of 10% per second or other time interval, the workload controller 124 may block 100% of all available circuits. However, if the rate of consumption of circuits is at or below a different threshold, a different number or percentage of available circuits can be blocked. For example, if 1% of the available circuits are being consumed per second or other time interval, the workload controller 124 can be arranged to block 10% of available circuits. It will be appreciated that the converse can apply in the event that the workload of the resource drops below an acceptable threshold level. Any other measure of workload can be used.

Although the above embodiments make reference to the communication system supporting a number of calls, embodiments are not limited thereto. Embodiments can be realised in which some other communication channel is supported by the communication system 102.

It will be appreciated that the above embodiments have been described with reference voice paths being established between the communication systems and the originating devices. Those voice paths have been described with reference to conveying speech signals. However, the voice paths could alternatively, or additionally, carry other signals such as, for example, data signals. For example, DTMF tones could be used to allow a user to interact with the communication system. Furthermore, it will be appreciated that the voice paths are embodiments of circuits or trunks.

The above embodiments have been described with reference to telephones 146 to 150 being used to communicate with the communication system 102. However, other communication devices can be used such as, for example, VOIP communication devices, computers, PDAs or any other communication device.

It will be appreciated from the above that the communication system 102 has been illustrated as being distinct from, for example, the second SSP 160 of the communication network 152. However, embodiments can be realised in which the communication system 102 also performs the functions required of the second SSP 160.

It will be appreciated by those skilled in the art that some form of circuit blocking, such as CICs in ISUP mode, will inform the remainder of the network elements that the platform or communication system 102 cannot handle more calls. However, the remote or calling end, that is, originating device, will have no indication that the communication cannot handle further calls because it is overloaded. As indicated above, the workload controller 124 does not force call termination. However, it issues a "block without release" command in accordance with which a circuit will be blocked when a pending call on that circuit has ended.

Embodiments can advantageously realise a smooth start to the communication system 102, that is, the workload can be progressively increased. Still further, the communication 102 might be operated in conjunction with at least another communication system, that is, the two or more communication systems might form nodes of a cluster. If some circuits are blocked on one node, calls could be diverted to the other node. However, embodiments require an increased amount of processing to be performed to maintain the internal circuit state information, which includes an indication of the cause of the blocking.

Figure 4:
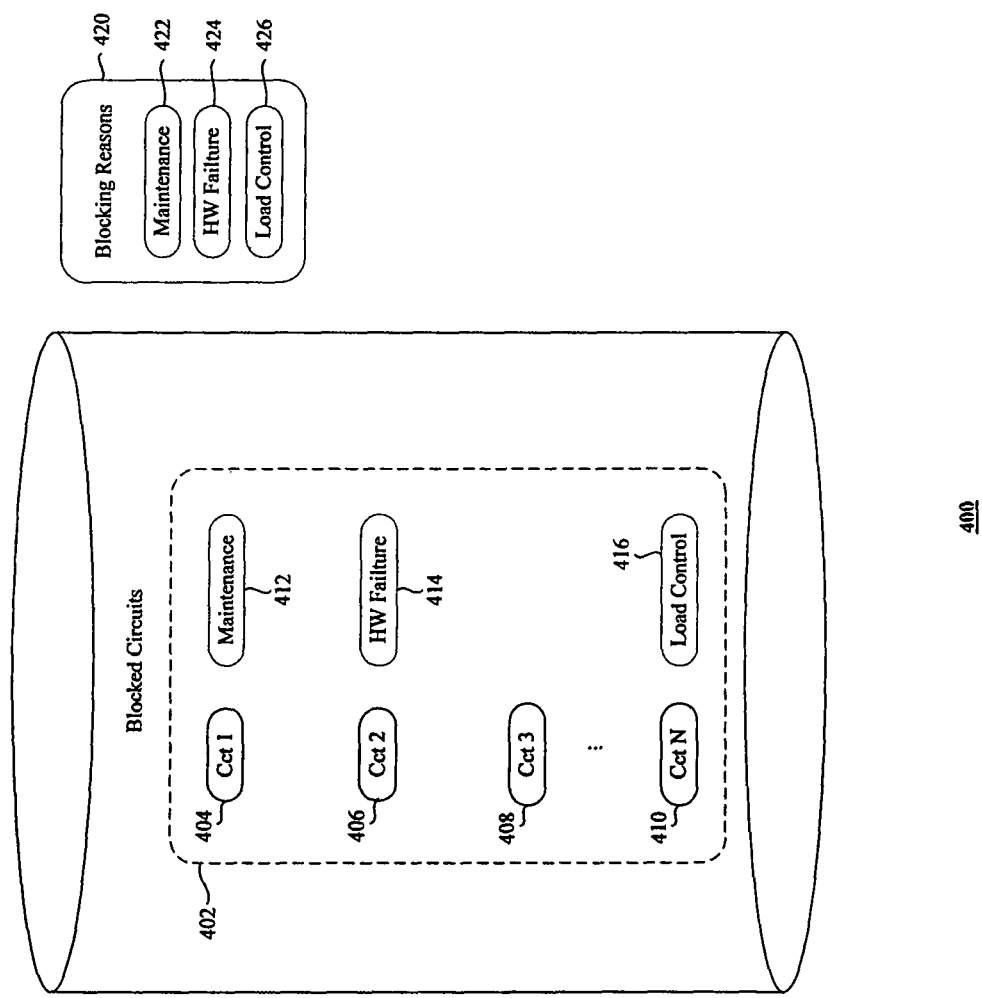
FIG. 4 depicts an embodiment of a data base.

Referring to FIG. 4, there is shown a further embodiment of a data base 400, which is an alternative to data base 128, containing data 402 associated with or representing the circuits or trunks available for use by the communication system 102. It can be appreciated that a number of such circuits 404 to 410 are illustrated. Each circuit 404 to 410 has data 412 to 418 representing a respective reason for the blocking of the corresponding circuit. It can be appreciated that there is also stored a data base 420 comprising a data representing reasons for blocking a circuit. The further data base 420 is illustrated as comprising three blocking reasons 422 to 426. Although the blocking reasons data base 420 has been illustrated as comprising three blocking reasons, the blocking reasons data base 420 could contain any other number of blocking reasons. A first blocking reason 422 is associated with blocking a circuit or trunk due to maintenance in relation to that circuit or trunk. A second blocking reason 424 is associated with blocking a circuit or trunk because of hardware failure. A third blocking reason 426 is associated with workload control, that is, the reason for blocking a particular circuit is related to at least one of the digital signal processing resources or applications described above being overloaded. Therefore, it can be appreciated that the first circuit 404 is indicated as having been blocked for maintenance reasons as can be appreciated by the corresponding blocking reasons data 412. A second circuit 406 is illustrated as having been blocked due to a hardware failure of some sort as can be appreciated by the hardware failure blocking reason data 414. A further circuit 410 is illustrated as having been blocked for reasons of load control as can be appreciated from the illustrated load control blocking reason data 416. The third circuit 408 is illustrated as not having been blocked.

It will be appreciated by those skilled in the art that an ISUP circuit can have a state as defined by the ITU, which is constructed from the following elements: busy/idle, a hardware-blocked, locally/remotely and maintenance-blocked, locally/remotely. A state value is determined from the eight possible combinations of the above elements. The workload controller according to embodiment of the present invention is responsible for setting the maintenance-locally-blocked part of the state.

Embodiments of the present invention add one or more of the following reasons for blocking a circuit: administrator blocked, that is, blocking of circuits intentionally by a system administrator, regulator-blocked, such as the blocking performed by the workload controller 124, and blocking due to availability.

It should be noted that, in preferred embodiments, the workload controller 124 does not designate any particular circuit to be blocked if call control or call load regulation is implemented. Circuit selection in light of proposed blocking is performed by the call handler 104, which can be implemented as an ISUP connection provider.

Figure 5:
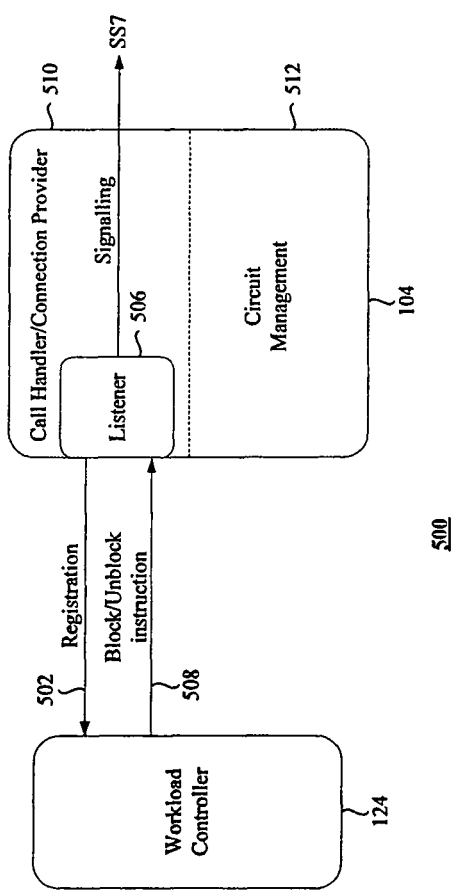
FIGS. 5 and 6 illustrate interactions between workload controller and a connection provider according to embodiments.

Referring to FIG. 5, there is shown, in greater detail, an exchange 500 between the workload controller and an embodiment of a call handler 104 or connection provider. It can be appreciated that the call handler 104 is functionally divided into two portions. The first portion is concerned with signalling and the interaction with the ISUP stack 106. The second portion is concerned with circuit management. The workload controller 124 interacts with a listener in implementing or enforcing a circuit blocking or circuit regulation policy. Embodiments can be realised in which the call handler forms part of the communication system 102 or part of some other network entity such as, for example, the SSP 160.

Embodiments can also be realised in which the communication system 102 is progressively activated. The communication system 102 is initialised such that all circuits, or at least a predetermined number of circuits, are marked as being blocked. The workload controller is arranged to progressively unblock the blocked circuits in order to manage the workload of the communication system, that is, in an attempt to ensure a smooth or progressive increase in the workload of the communication system 102. For example, an embodiment can be realised in which a predetermined percentage such as 1% of the initially blocked circuits is released or unblocked and then, at a predetermined period of time later, a further predetermined percentage such as 1% of the initially blocked circuits is unblocked. It will be appreciated, if the predetermined period of time between unblocking a predetermined number of circuits is fixed or regular, that the total time taken to release or unblock 100% of the circuits will be given by the total number of circuits multiplied by the time interval between unblocking circuits divided by the number of circuits released at a time.

The call handler 104 or connection provider is realised as an instance of an object which, when instantiated, registers itself with the workload controller 124 as can be appreciated from the registration message 504 passed from a listener 506 to the workload controller 124. Therefore, it will be appreciated that the workload controller may interact with a number of registered call handlers 104. More particularly, the listener or listener object 506 of the call handler 104 is arranged to register itself with the workload controller 124. Once registered, the workload controller 124 can communicate with the listener or listener object 506 to manage load or congestion by instructing connected equipment such as the SSP 160 to reduce traffic to the communication system 102 or, if the communication system 102 forms part of a cluster, to direct traffic to another node of the cluster, via corresponding messages 508. Therefore, it will be appreciated that embodiments can be realised in which incoming calls are rejected by the communication system 102 according to the load imposed on the digital signal processing resources 116 to 120 of the communication system 102.

Embodiments can be realised in which the number of rejected incoming calls varies according to at least one, and preferably three, workload levels such that a greater number or percentage of incoming calls are rejected as the workload increases. For example, if the load on the digital signal processing resources exceeds a predetermined percentage such as, for example, 85%, the workload controller 124 can instruct the call handler or connection provider 104 to reject 50% of incoming calls. If the load on the digital signal processing resources exceeds a second, higher, predetermined threshold such as, for example, 87%, the workload controller 124 instruct the call handler or connection provider 104 to reject 90% of incoming calls. If the workload on the digital signal processing resources exceeds the third, higher, predetermined threshold such as, for example, 90%, the workload controller 124 instructs the call handler or connection provider 104 to reject all incoming calls. It will be appreciated that the converse is true, that is, as the load on the digital signal processing resources decreases below the above thresholds, the workload controller 124 will instruct the call handler 104 to accept an appropriate number of incoming calls.

The workload controller 124 forwards the instructions or commands 508 to reject calls to the above described listener or listener object 506. In response to receiving such an instruction or command 508, the listener-object 506 attempts to identify at least one circuit to be blocked. Embodiments can be realised in which the listener or listener object 506 is arranged to identify a number of consecutive circuits that can be blocked. It will be appreciated by one skilled in the art that the converse is true, that is, the listener or listener object 506 can be arranged to identify at least one circuit or a number of consecutive circuits that can be unblocked in response to receiving an instruction from the workload controller 124 to that effect.

Preferably, the listener or listener object 506 is arranged to block circuits according to prevailing conditions. For example, the listener or listener object 506 blocks idle circuits first if possible. The listener or listener object 506 is, preferably, configured to block a predetermined number of circuits in response to an instruction 508 from the workload controller 124 to block circuits. If the instruction 508 to block the predetermined number of circuits cannot be realised by blocking idle circuits, circuits that are in use will be blocked when their associated calls have terminated.

When the listener or listener object 506 is requested to unblock circuits, an attempt is made to unblock those circuits that have been previously blocked in response to a request received from the workload controller 124 in preference to unblocking other circuits.

It will be appreciated that embodiments give effect to circuit blocking, that is, influencing call signalling such as call set up, is in response to the workload of resources within or accessible by the communication system, which is distinguished from the congestion control measures, which are responsive to a measure of call setup signalling. In essence, circuit blocking within the context of the present application is responsive to non-call signalling workload whereas congestion control is responsive to call signalling workload. Use of a signalling congestion control protocol to manage non-signalling workloads of resources of a communication system provides a viable alternative to conventional load balancing amongst those resources Embodiments can be realised in which selected circuits are excluded from the circuits available to be blocked or unblocked. For example, administrator blocked circuits or hardware blocked circuits can be excluded from consideration in response to a request from the workload controller 124 to unblock circuits.

As mentioned above, the call handler 104 comprises two portions 510 and 512. The first portion 510, comprising the listener 506, is responsible for handling signalling such as, for example, the SS7 signalling illustrated. The second portion 512 is responsible for handling the circuit blocking or circuit management functions performed by embodiments of the invention.

Figure 6:
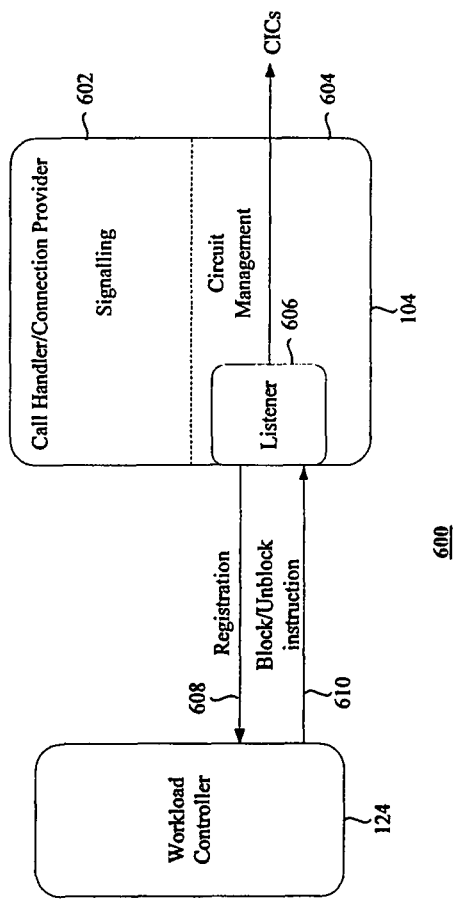

Referring to FIG. 6, there is illustrated an exchange 600 between the workload controller 124 and an embodiment of the caller handler 104 which comprises, again, a signalling portion 602 and a circuit management portion 604. The circuit management portion 604 comprises a listener 606, which registers with the workload controller 124 on instantiation via a corresponding message 608. Thereafter, the workload controller 124 and the listener 606 interact such that the latter responds to commands or instructions 610 from the workload controller 124 to block or unblock an individual circuit or a set of contiguous or non-contiguous circuits.

Although the above embodiments have been described with reference to circuits being unblocked at regular time intervals, embodiments are not limited to such an arrangement. Embodiments can be realised in which circuits are unblocked at other time intervals, which may be irregular. Embodiments can be realised in which circuits are unblocked at time intervals that are progressively increasing or progressively decreasing. For example, a first circuit or set of circuits can be unblocked at initialisation of the system. After a first period of time, a second circuit or set of circuits can be unblocked. After a second period of time, which is half the first period of time, a third circuit or set of circuits can be unblocked and so on with each successive time interval between unblocking a circuit or set of circuits being reduced by half, or some other multiple or by some other amount, as compared to a preceding time interval.

The above embodiments have been described with reference to blocking or refusing to establish a circuit within communication network, embodiments are not limited to connection-oriented channels. Embodiments can be realised using connectionless communication channels. For example, embodiments of the present invention can be realised in which the communication channels are circuit switched or packet switched. Consequently, it will be appreciated that the communication network can be a packet switched network or a circuit switched network.

The invention claimed is:

1. A communication system comprising: a call handler configured to process incoming call set up signaling received from a communication network for setting up an incoming call;
    a workload controller having hardware and configured to determine a workload of at least one processing resource accessible by the communication system,
    wherein the call handler is responsive to instruction from the workload controller to influence blocking establishment of at least one communication channel of the communication system, wherein the instruction is in response to the determined workload of the at least one processing resource,
    wherein the workload controller is configured to instruct blocking of a number of communication channels or a percentage of communication channels as a function of a current rate of consumption of communication channels, wherein different non-zero communication channels or different non-zero percentages of communication channels are blocked for different current rates of consumption of communication channels, wherein each blocked communication channel is unavailable for use in setting up the incoming call, and
    wherein the workload controller is configured to unblock a predetermined number of communication channels or a predetermined percentage of communication channels in response to a current rate of release of communication channels; and
    a non-transitory storage medium to store a database including data for respective ones of the communication channels of the communication system, wherein the data includes indicators to indicate whether respective ones of the communication channels have been blocked, wherein a particular one of the indicators has a first value to indicate that the corresponding communication channel is blocked and a second value to indicate that the corresponding communication channel is not blocked.

2. A communication system as claimed in claim 1, wherein the workload controller is configured to compare the determined workload against at least a first threshold value and to block at least one communication channel in response to determining that the determined workload has a predetermined relationship to the first threshold value.

3. A communication system as claimed in claim 2, wherein the predetermined relationship is that the determined workload is above the first threshold value.

4. A communication system as claimed in claim 2, wherein the workload controller is configured to compare the determined workload against at least a second threshold value and to unblock at least one communication channel in response to determining that the determined workload has a predetermined relationship to the second threshold value.

5. A communication system as claimed in claim 4, wherein the predetermined relationship to the second threshold value is that the determined workload is below the second threshold value.

6. A communication system as claimed in claim 1, wherein the workload controller is configured to identify at least one selectable communication channel as being excluded from being blocked.

7. A communication system as claimed in claim 6 in which sets of communication channels are to be unblocked after respective intervening time intervals.

8. A communication system as claimed in claim 1, wherein the workload controller is configured to nominate at least one communication channel that is prevented from being blocked.

9. A communication system as claimed in claim 1, wherein blocking of the number of communication channels or the percentage of communication channels comprises blocking of a number of circuits or a percentage of circuits.

10. A communication system as claimed in claim 1, wherein different non-zero communication channels or different non-zero percentages of communication channels are unblocked for different rates of release of communication channels.

11. A communication system as claimed in claim 10, wherein the unblocking comprises unblocking of a number of previously blocked communication channels or a percentage of previously blocked communication channels as a function of the rate of release of communication channels.

12. A system comprising:
    a workload controller having hardware and configured to determine a workload of at least one voice application and to control establishment of call connections using respective communication channels to an interactive voice response system in response to the determined workload, wherein the workload controller is to instruct blocking of a number of communication channels or a percentage of communication channels as a function of a rate of consumption of communication channels, where different non-zero communication channels or different non-zero percentages of communication channels are blocked for respective different rates of consumption of communication channels, and wherein the workload controller is to further unblock a number of communication channels or a percentage of communication channels in response to a rate of release of communication channels; and a non-transitory storage medium to store a database including data for respective ones of the communication channels, wherein the data includes indicators to indicate whether respective ones of the communication channels have been blocked, wherein each blocked communication channel is unavailable for use to establish the call connections, wherein a particular one of the indicators has a first value to indicate that the corresponding communication channel is blocked and a second value to indicate that the corresponding communication channel is not blocked.

13. A system as claimed in claim 12, further comprising a call handler, wherein the workload controller is configured to instruct the call handler to block a particular one of the communication channels based on the determined workload, wherein a pending call connection on the particular communication channel is allowed to proceed even after the particular communication channel is blocked, and wherein a new call connection is blocked from using the particular communication channel after the particular communication channel is blocked by the call handler.

14. A system as claimed in claim 12, wherein the workload is a non-signaling workload.

15. A system as claimed in claim 14, wherein the non-signaling workload includes one or more selected from outputting voice menus, processing responses to voice menus, and recognizing incoming speech.

16. A system as claimed in claim 12, wherein different non-zero communication channels or different non-zero percentages of communication channels are unblocked for different rates of release of communication channels.

17. A system as claimed in claim 16, wherein the unblocking comprises unblocking of a number of previously blocked communication channels or a percentage of previously blocked communication channels as a function of the rate of release of communication channels.

18. A method for influencing workload of a communication system, the method comprising:

receiving an indication of a current workload of at least one processing resource; and in response to the indication, instructing blocking, by a workload controller having hardware, usage of a particular communication channel of a communication network for an incoming call, wherein the workload controller instructs blocking of a number of communication channels or a percentage of communication channels as a function of a rate of consumption of communication channels, where different non-zero communication channels or different non-zero percentages of communication channels are blocked for different rates of consumption of communication channels;

instructing unblocking, by the workload controller, of a number of communication channels or a percentage of communication channels as a function of a rate of release of communication channels;

allowing a pending call on the particular communication channel to proceed even after the particular communication channel has been blocked; and providing a database including data for respective ones of the communication channels of the network, wherein the data includes indicators to indicate whether respective ones of the communication channels have been blocked, wherein a particular one of the indicators has a first value to indicate that the corresponding communication channel is blocked and a second value to indicate that the corresponding communication channel is not blocked.

19. A method as claimed in claim 18, wherein the current workload is a non-signaling workload including one or more selected from outputting voice menus, processing responses to voice menus, and recognizing incoming speech.

20. A method as claimed in claim 18, wherein the particular communication channel comprises a circuit.

21. A method as claimed in claim 18, wherein different non-zero communication channels or different non-zero percentages of communication channels are unblocked for different rates of release of communication channels.

22. A method as claimed in claim 21, wherein the instructing of the unblocking comprises instructing unblocking of a number of previously blocked communication channels or a percentage of previously blocked communication channels as a function of the rate of release of communication channels.

* * * * *